F. G. BREYER AND E. H. BUNCE.
TREATING ZINC OXID.
APPLICATION FILED AUG. 9, 1918.
1,339,544.
Patented May 11, 1920.
4 SHEETS—SHEET 1.
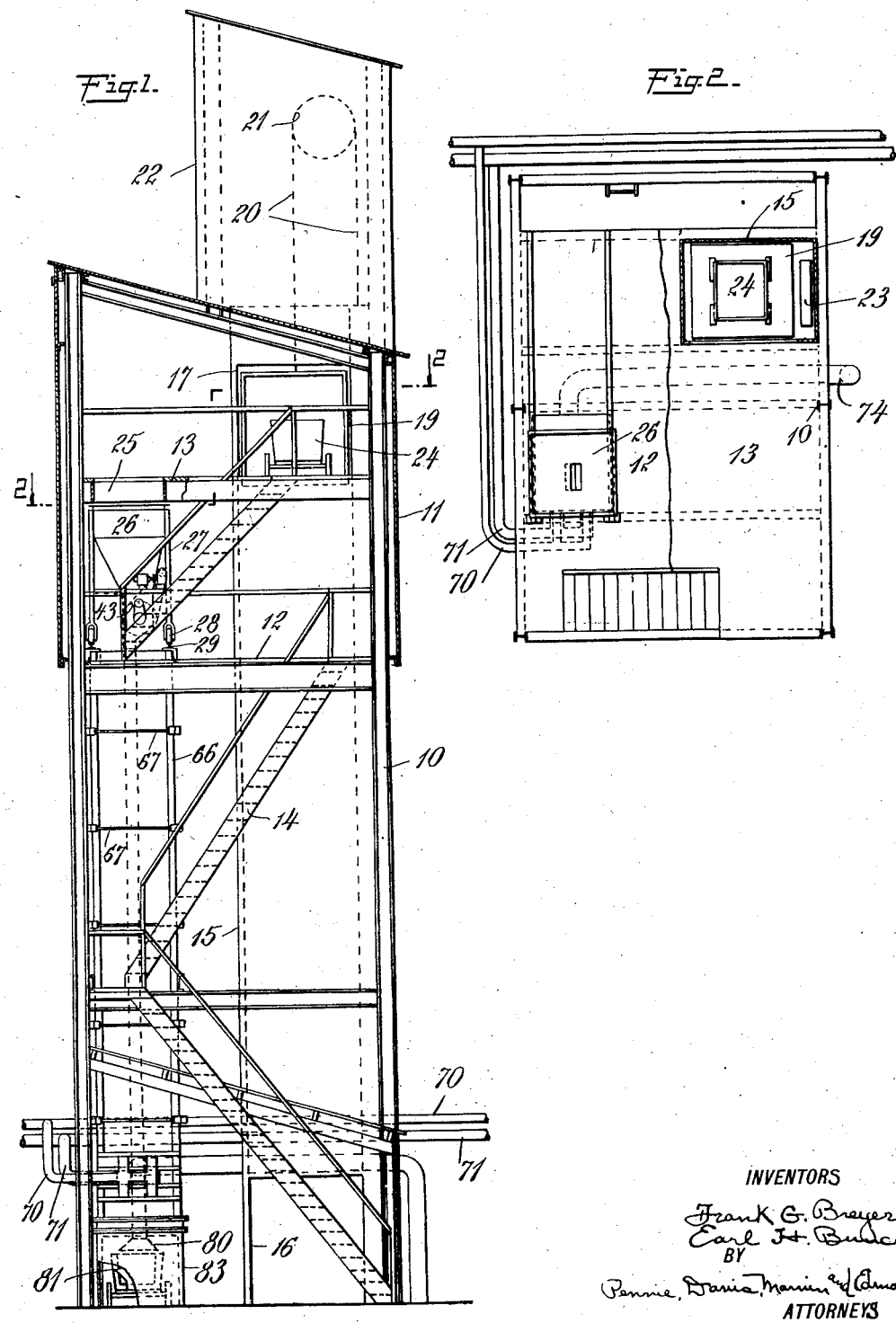
INVENTORS
Frank G. Breyer,
Earl H. Bunce,
BY
Pennie, Davis, Marvin & Edmonds
ATTORNEYS

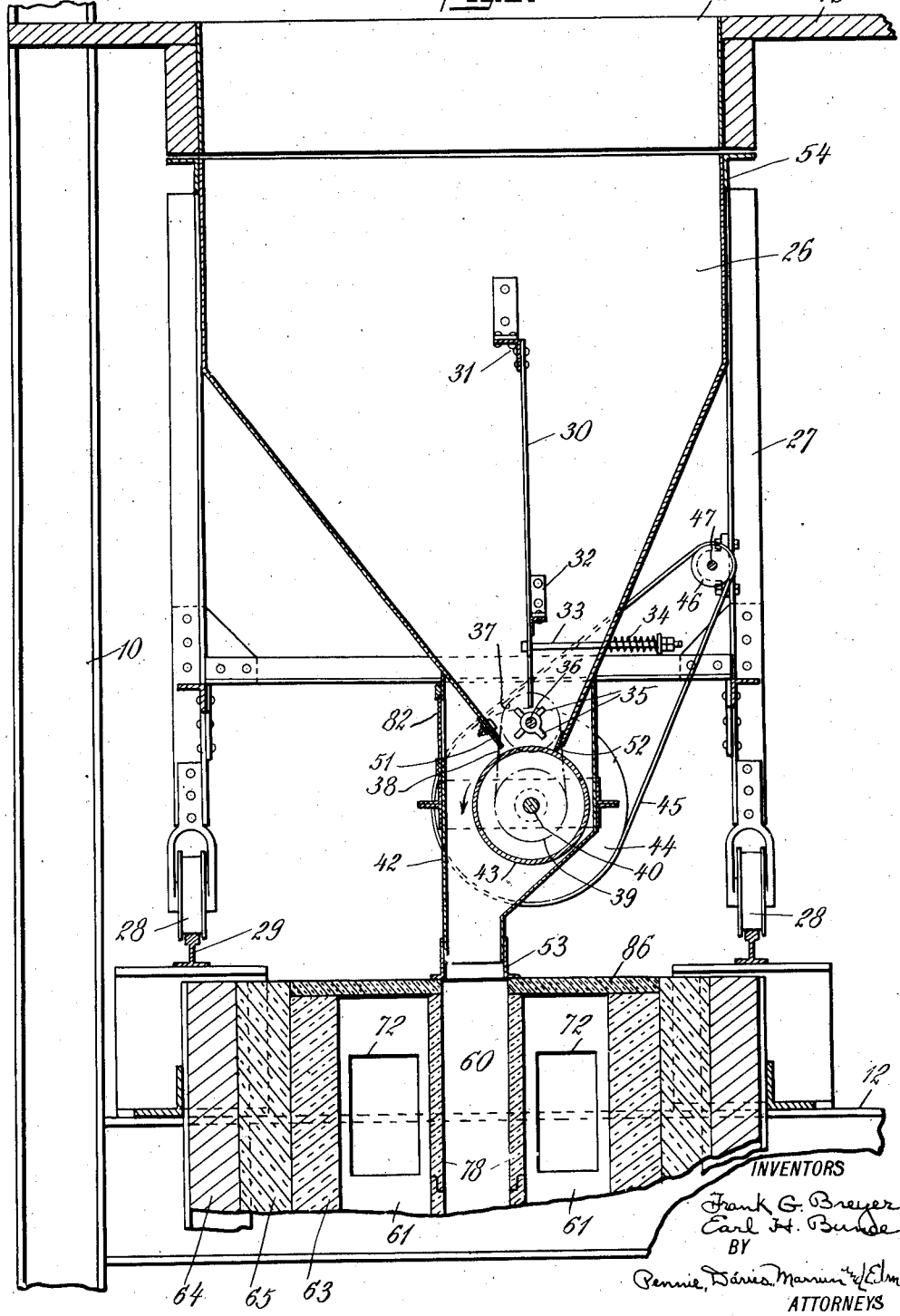

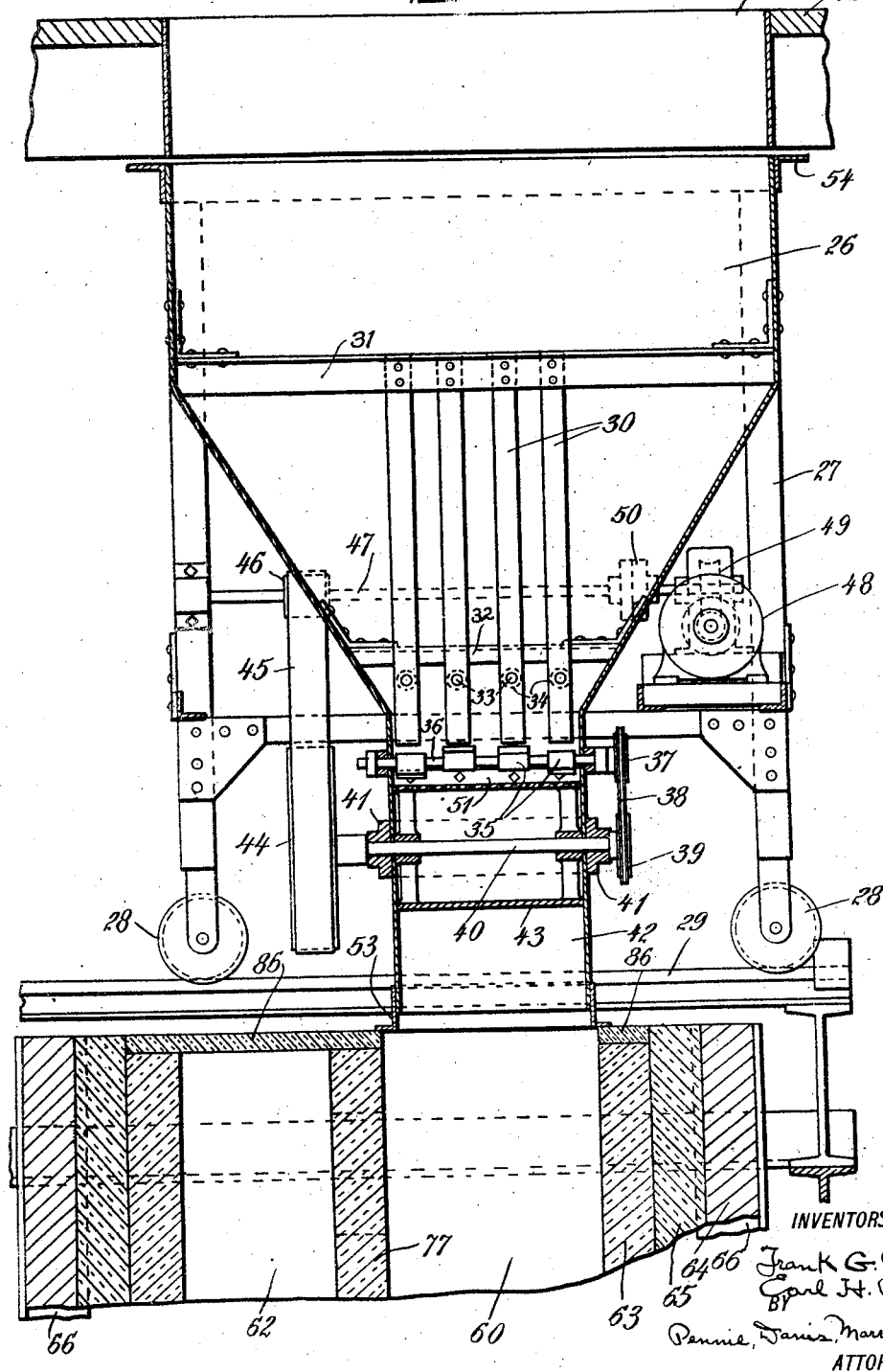

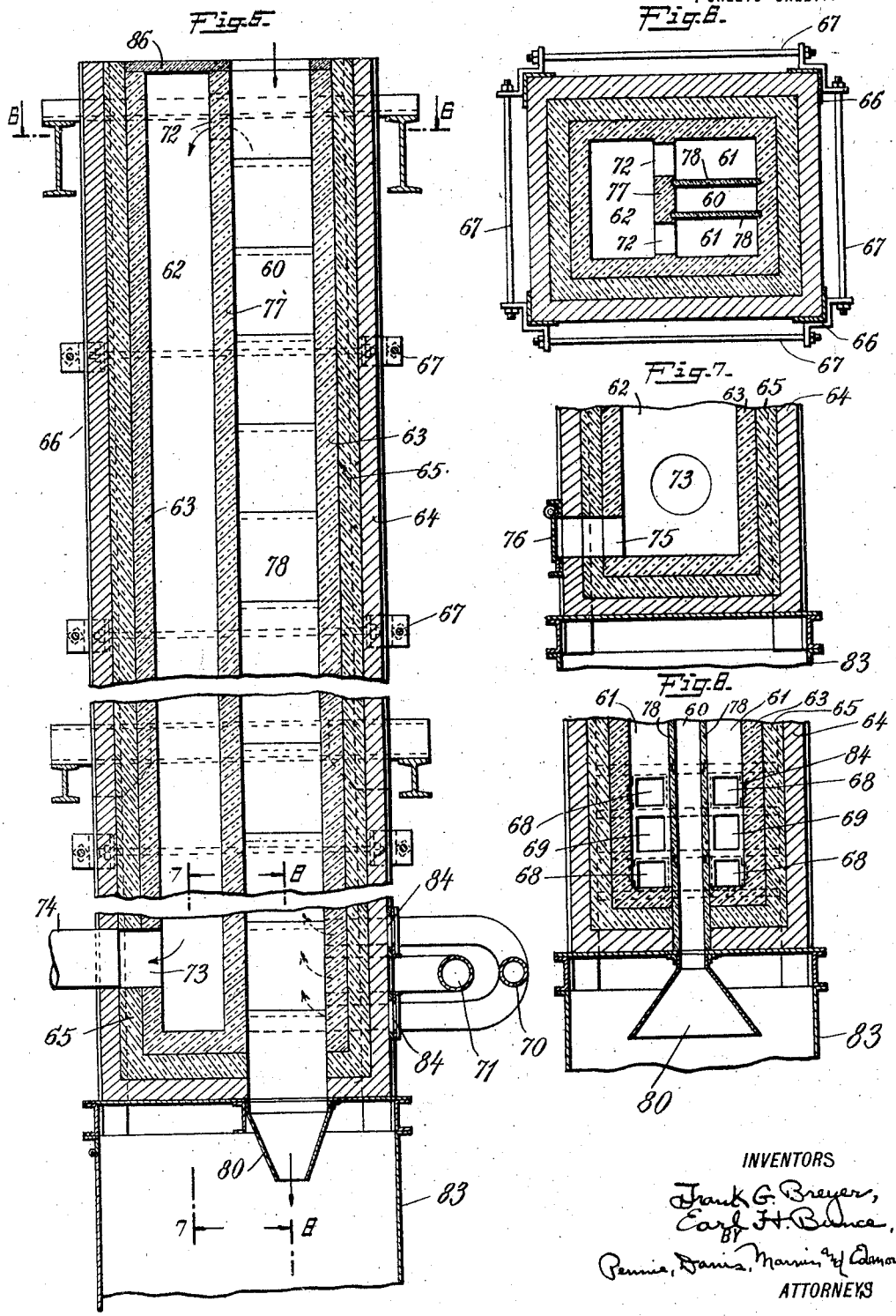

UNITED STATES PATENT OFFICE.

FRANK G. BREYER AND EARL H. BUNCE, OF PALMERTON, PENNSYLVANIA, ASSIGNORS TO THE NEW JERSEY ZINC COMPANY, OF NEW YORK, N. Y., A CORPORATION OF NEW JERSEY.

TREATING ZINC OXID.

1,339,544.   Specification of Letters Patent.   Patented May 11, 1920.

Application filed August 9, 1918. Serial No. 249,045.

*To all whom it may concern:*

Be it known that we, FRANK G. BREYER, a citizen of the United States, residing in Palmerton, Carbon county, State of Pennsylvania, and EARL H. BUNCE, a citizen of the United States, residing at Palmerton, Carbon county, State of Pennsylvania, have invented certain new and useful Improvements in Treating Zinc Oxid; and we do hereby declare the following to be a full, clear, and exact description of the invention, such as will enable others skilled in the art to which it appertains to make and use the same.

This invention relates to an improved process for treating zinc oxids, such as the French process oxids, which are substantially free from lead, as well as leaded zinc oxids, by reheating to improve their color and thus increase their value as pigments.

In the procedure heretofore commonly followed for reheating zinc oxids, horizontal retorts have been utilized, the zinc oxids being generally charged into the retorts manually to a depth of about four or five inches. The ends of the retorts are vented so as to permit the escape of volatilized impurities and combustible vapors, and to permit the workmen to turn the charge over from time to time to expose fresh surfaces to the heat conducted inwardly from the walls of the retorts. Such retorts may, however, be entirely filled, and the reheating carried out without subsequent turning over of the charge until its removal. The zinc oxid is itself a poor conductor of heat, and it is difficult to heat the center of the charge to the desired degree, or, if the center be heated sufficiently, the portions of the charge lying adjacent to the walls of the retort are heated to too high a degree. Such reheating of the zinc oxid may consume a number of hours, and is usually but moderately efficient.

The present invention aims to overcome such objections and involves the provision of a process for the treatment of zinc oxids whereby uniformity of reheating is obtained, while the operation of reheating consumes but a small amount of time and yields a superior product.

The operation of the present invention involves supplying the zinc oxid continuously to the upper end of an upright tube or retort, the walls of which are maintained at a high temperature, allowing the oxid to pass downwardly through the tube by gravity in a continuous stream, and heating it uniformly to the required degree during its passage.

The tube is preferably disposed in a substantially vertical position so that its interior wall offers practically no resistance or impediment to the passage of the oxid therethrough. In other words, the position of the tube is such that whatever contact there is between the oxid and the interior wall of the tube does not appreciably impede the free passage of the oxid therethrough by gravity.

The tube is preferably elongated or oblong in cross-section. The particular cross-sectional configuration can be varied and may be rectangular or elliptical, an important feature being the relatively shallow depth or width of the cross-sectional configuration. By employing this cross-sectional shape, the flow of oxid passing through the tube is caused to assume the form of a relatively thin stream, so that a uniform heating of all of the oxid particles takes place.

The tube is further of considerable length so that the passage of the oxid therethrough will require such a length of time as will insure heating of the oxid to the required degree. In practice, it has been found that excellent results may be obtained with a tube of approximately 35 feet in length, which, throughout the reheating operation, is maintained at a temperature varying between a dull red and a bright yellow.

In carrying out the present invention, the oxid is fed into the upper inlet end of the substantially vertical tubular retort or furnace heated to the temperature mentioned. The oxid drops freely through the tube and is heated with substantial uniformity, with the result that on reaching the bottom of the tube the product is of a substantially uniform and homogeneous character.

The feeding of the zinc oxid into the upright tubular retort or furnace is preferably effected in such a manner that the material enters the heating tube or chamber in a continuous thin stream or sheet of substantially the width of the greater dimension of the cross-sectional area of the chamber. In falling through a vertically disposed heating chamber of such cross-sectional shape, the oxid particles scatter and disperse more or less throughout the chamber, but the general form of the material as it falls through the chamber is that of a relatively thin stream or sheet, due to the cross-sectional shape of the chamber. Substantially every particle of the zinc oxid is thus uniformly exposed to the desired degree of heat in its passage through the heating chamber.

We have found that the color of certain zinc oxids is improved after passing through the furnace, if the oxid is maintained at the reheating temperature, or substantially at that temperature, for a considerable period of time after it has been reheated. This may be characterized as allowing the oxid to soak in the heat stored therein. This procedure, with some oxids, results in a further substantial improvement in the color of the oxid. For this purpose, a plurality of containers for the oxid are provided so constructed as to restrict the radiation of heat from the material therein. The temperature of the oxid, after passing through the tube furnace and being collected in the containers provided therefor, commonly varies between about 600° C. and about 650° C., and the period of soaking in the containers may vary from one hour up to twelve hours or longer.

If desired, the containers may be specially constructed to permit of utilizing a heating medium from an external source in holding the material at the elevated temperature to which it has been raised. Thus, the exhaust gases of combustion from the furnaces in which the oxid is heated may be carried around the container, so as to guard against any substantial drop in the temperature of the oxid therein contained for a sufficient period of time.

The features of the invention hereinbefore referred to in general terms will be better understood by reference to the following description taken in conjunction with the accompanying drawings, which illustrate a practical embodiment of the invention. It will be understood, however, that the construction herein illustrated and described is merely illustrative of how the features of the invention may be employed and that the invention is not limited as to structural features except as may be indicated by the terms employed in the claims appended hereto.

In the drawings;

Figure 1 is a view, in elevation, of the furnace and the parts of the heating apparatus employed therewith;

Fig. 2 is a sectional plan taken on the line 2—2 of Fig. 1;

Fig. 3 is a sectional elevation of the feeding mechanism and the upper end of the furnace;

Fig. 4 is a similar sectional elevation taken at right angles to that of Fig. 3;

Fig. 5 is a sectional elevation of the tube furnace; and

Figs. 6, 7 and 8 are sectional plans taken on the section lines 6—6, 7—7 and 8—8, respectively, of Fig. 5.

Referring now more particularly to the drawings, it will be observed that the complete apparatus comprises the tube furnace disposed in a substantially vertical position, suitable mechanism for feeding into the top thereof, in a substantially uniform and continuous manner, the zinc oxid to be treated, and a receptacle for collecting the reheated product as it falls from the bottom of the tube furnace. The tube furnace is supported in a substantially vertical position by a structural steel framework 10. As illustrated in the drawings, this framework is built up of six vertical I-beams secured together at suitable intervals by transverse or horizontal I-beams. The upper part of the framework 10 is inclosed to provide a pent house 11 for the accommodation or housing of the feeding mechanism for the tube furnace.

The pent house has a lower floor or platform 12 and an upper or charging platform 13. These platforms are reached from the ground by suitable stairways 14. An elevator hatch 15 is built within the framework 10, and has a door 16 at its lower or ground end and a door 17 opening onto the charging platform 13. An elevator 19 is operatively mounted in the hatch 15 by means of a suitable suspension cable 20 and a co-operating rotary drum 21 arranged in the housing 22 on top of the pent house. A counter-weight 23 for the elevator is secured in the usual manner to the cable 20.

By means of this elevator, the zinc oxid to be reheated can thus be conveniently brought in a car 24 from the ground to the charging or feeding platform 13 of the pent house. The charging platform has an opening 25 directly above and substantially registering with the upper or enlarged end of a feed hopper 26. The hopper 26 is a part of the feeding mechanism by wich the zinc oxid to be heated is continuously fed in a thin uniform stream into the upper end of the tube furnace.

The feeding mechanism is assembled on a framework or carriage 27 provided with wheels 28 mounted on rails 29 secured to the lower platform 12 of the pent house. At its lower end the sides of the hopper 26 converge to form an elongated or narrow discharge opening of about the same configuration as the cross-section of the heating tube of the furnace, as will be more fully described hereinafter. The interior of the hopper is provided with agitating means to prevent packing of the zinc oxid therein. The agitating means illustrated in Figs. 3 and 4 of the drawings consist of four relatively stiff but resilient strips or agitators 30 secured at their upper ends to a cross beam 31 and depending therefrom to within a short distance of the lower or discharge end of the hopper. The agitators 30 are resiliently held against a stop plate 32, rigidly secured within the lower end of the hopper, by means of horizontal rods 33 and coöperating springs 34. A dog 35 secured to a shaft 36 rotatably mounted in the lower end of the hopper is provided for each agitator 30, and in the rotation of the shaft 36 each dog engages its coöperating agitator and moves it against the action of the spring 34 a short distance away from the stop plate 32, and then releases it, whereupon the spring 34 operates to move the agitator back against the stop plate. Each of the agitators is thus given a vibratory movement, the effect of which is most pronounced at the lower or discharge end of the hopper, so that the zinc oxid of the charge is thereby prevented from packing in the hopper. The dogs 35 are spaced about the shaft 36 so as to evenly distribute their engagements with the agitators throughout each revolution of the shaft. Thus, with four agitators, and four coöperating dogs, the four dogs are displaced on the shaft at right angles to each other.

The shaft 36 has secured thereto, exteriorly of the hopper, a link belt sprocket 37. A link belt chain 38 operatively connects the sprocket 37 with a second link belt sprocket 39 secured to a shaft 40 journaled in suitable bearings 41. The bearings 41 are fastened in any suitable manner to the exterior of a feed funnel 42, into the upper ends of which the lower or restricted end of the hopper extends. A cylindrical drum 43 is mounted on the shaft 40 within the feed funnel 42 and is disposed with its periphery directly in the path of the material discharged from the bottom of the hopper 26.

The shaft 40 also carries a pulley 44 which is connected by a belt 45 with a second pulley 46 on a shaft 47. The shaft 47 is adapted to be driven by an electric motor 48 through a worm reduction gear 49 and a flexible coupling 50. The shafts 40 and 36 are thus driven by the motor 48 through the intermediate gearing and connections just described.

The drum 43 rotates in the direction of the arrow, Fig. 3, and in its rotation carries along on its upper periphery a thin uniform layer of zinc oxid which it receives from the bottom of the hopper 26. The thickness of this layer of zinc oxid carried along by the rotating drum 43 may be regulated by means of an adjustable slide 51. In order to prevent the passage of any zinc oxid over the drum 43 in a direction opposite to its direction of rotation, a metal strip 52 may be used to seal or close the space between the lower end of the hopper and the periphery of the rotating drum. The zinc oxid which is carried along by the rotating drum from beneath the hopper 26 falls by gravity from the surface of the drum at a point substantially over the center of the heating tube of the furnace.

The lower end of the feeding funnel 42 is of elongated cross-section conforming substantially to the elongated cross-section of the heating tube of the furnace. A fitting 53 is telescopically mounted on the lower end of the feed funnel 42 and serves to directly connect the discharge end of the feed funnel to the upper end of the heating tube of the furnace. The upper end of the hopper 26 is provided with a similar fitting 54 telescopically mounted thereon for effecting a substantially closed engagement between the opening 25 of the charging floor 13 and the upper end of the hopper. When it is desired to move the feeding mechanism along the rails 29, it will, of course, be understood that the telescopic members 53 and 54 may be suitably adjusted to provide the necessary clearance for such movement.

The tube furnace illustrated in the drawings, in its complete form, comprises a vertically disposed heating tube or flue 60 of elongated cross-section with a combustion flue 61 parallel to and adjacent each of the wide sides thereof, and an exhaust flue 62 also parallel to and adjacent one of the narrow sides thereof. The interior or lining 63 of this furnace is made of fire brick while the outer structure 64 may advantageously be built of ordinary red brick or the like. Preferably, an intermediate structure 65 is provided between the fire brick lining 63 and the outer structure 64 and this intermediate structure 65 may be composed of any suitable material, but need, of course, be less fire and heat resistant than the material of the lining 63. The corners of the outer structure 64 are provided with angle irons 66 and the entire structure is held together by a plurality of stay rods 67 and supported by the framework 10.

Two air ports 68 and a gas port 69 are provided at the lower end of each combustion flue 61. The four air ports 68 are in communication with an air supply main 70, while the two gas ports 69 are in communication with a gas supply main 71. Near the upper end of the furnace each combustion flue 61 communicates through an opening 72 with the exhaust flue 62. The spent products of combustion pass out of the exhaust flue 62 through an opening 73 near the lower end thereof into an exhaust conduit 74 communicating with a suitable stack, not shown. An outlet 75, normally closed by a door 76, is provided at the lower end of the exhaust flue 62 for the convenient removal of any soot, dust or the like, which may collect therein.

The various flues of the complete tube furnace just described are formed by only three partitions or walls within the lining 63. It will be observed from Fig. 8 of the drawings that the complete tube furnace is generally rectangular in cross-section. A fire-brick partition 77, in the upper end of which are the aforementioned ports or openings 72, extends throughout the entire length of the furnace and divides the exhaust flue 62 from the heating or treatment flue 60 and the combustion flues 61. The heating or treatment flue 60 is formed by two spaced partitions 78 extending between one side of the lining 63 and the partition 77. Each partition 78 consists of a plurality of matched tiles of special fire brick mounted one above the other in suitable coöperating grooves in the partition 77 and the opposite side of the lining 63. It will be seen that the heating flue or chamber 60 so formed is rectangular and oblong in cross-section, so that the zinc oxid falls therethrough in a relatively thin stream or layer.

A firebrick cap or cover 86 rests upon the top of the lining 63 and the partitions 77 and 78, and has therein an opening registering with the top of the heating chamber 60, so that all the flues of the furnace, with the exception of the heating flue 60, are closed at the top by the cover 86.

The furnace is supported in a substantially vertical position on the transverse or horizontal beams of the framework 10. This requires that the furnace be made of considerable length so that the material, while dropping through the furnace by gravity, will be subjected to the heating action, the requisite amount of time. Practice has shown that with a furnace approximately 35 feet in length and mounted in a substantially vertical position, the particles of the material being treated pass through the furnace in approximately two seconds, and that this period of time is adequate for the reheating of zinc oxid to improve its color, if the walls of the tubular passage through the furnace be heated to a temperature somewhere between a dull red and a bright yellow color, depending upon the character of the material handled.

The bottom of the heating tube or flue 60 is provided with a discharge spout 80 which is enlarged or flared in the direction of the flue's narrow axis or dimension and is converged in the direction of the flue's greater dimension, whereby the material is discharged into the container or receptacle. The receptacle 81 may be a plain open and uninsulated pan, or in certain cases a specially constructed container which precludes to a marked degree the radiation of heat therefrom. Thus, the receptacle illustrated in Fig. 1 has double walls to prevent the radiation of heat therefrom, and the space between these walls may be dead air space, or may be filled with asbestos, sil-o-cel, or other heat insulating material. When a receptacle 81 of the type illustrated in the drawings is employed it is preferably provided with a cover of the double wall type for use during the soaking period. This cover may be provided with a vent-opening to permit the free escape of undesirable vapors given off during the heat soaking operation.

The receptacle 81 is preferably mounted on wheels or on a suitable carriage in order that it may be conveniently placed in position beneath the discharge spout 80 and, when filled, withdrawn to a suitable location for the subsequent heat-soaking operation, which goes on in the receptacle, and which may be continued for a period of time of one to twelve hours, depending upon the character of the product. The bottom of the furnace is provided with an apron or housing 83 forming a substantially closed chamber for the accommodation of the receptacle 81. The apron 83 has the usual doors for permitting the entrance and withdrawal of the receptacle.

The operation of the apparatus thus constructed has been in part indicated in connection with the foregoing description. The zinc oxid to be treated is raised by the elevator 19, discharged into the feed hopper 26, and fed by means of the rotating drum 43 in a thin uniform layer substantially over the center of the heating flue 60. The adjustment of the slide 51 and the speed of rotation of the drum 43 determine the rate at which the oxid is fed to the furnace, and by means of the feeding mechanism described and illustrated, the oxid is supplied at this rate continuously and uniformly and is effectively prevented from packing the hopper. The upper end of the feed funnel 42 has a slide 82 substantially in front of the adjustable slide 51, so that, by opening the slide 82, adjustment of the slide 51 may be effected, and the nature of the feeding operation observed.

As the oxid drops from the revolving feed cylinder into the heating chamber 60, it scatters and disperses throughout the chamber, and substantially every particle of the material is exposed to the highly heated atmosphere within the chamber. The cross-sectional shape of the chamber is such that the material as a whole falls through the chamber in the form of a relatively thin stream or sheet, so that the oxid is uniformly heated.

The heating chamber 60 is in the nature of a vertical retort, open at its ends, and heated by the combustion of gases in the two adjacent flues 61. Combustible gaseous fuel is supplied to the flues 61, through the gas ports 69, from the gas supply main 71, while air, preheated or not, is supplied to the flues 61, through the air ports 68, from the air supply main 70. Gate valves or slides 84 coöperate with the air ports 68 to regulate the amount of air supplied to each of the combustion flues 61. If desired, the air supply main 70, through which air under pressure may be supplied to the combustion flues 61, may be dispensed with, in which event the air ports 68 communicate directly with the outside atmosphere and air is drawn into the combustion flues 61 through the ports 68 by the natural draft in these flues. The exhaust products from the combustion flues 61 pass through the openings 72 into the exhaust flue 62 and thence to the conduit 74 and stack.

While the heating flue or chamber 60 is structually open at its upper end, it is functionally closed or sealed by the feeding mechanism and the zinc oxid in the hopper 26. Similarly at the bottom, although the heating chamber 60 is open, it is in effect sealed by the inclosing apron 83.

It will be noted that the oxid is treated in a continuous process whereby a high output of the reheated product is obtained, and that all of the oxid is similarly subjected to the heating influence, as a result of which the requisite uniformity in the degree of reheating is attained. The oxid issuing from the outlet of the furnace, and accumulating in the receptacle or container therebeneath is at a temperature of approximately 600° C. to 650° C., and may remain as desired at or near this temperature for a considerable time in the receptacle during the heat-soaking operation. At the end of the soaking the oxid may be withdrawn from the insulated receptacle and cooled quickly, or otherwise cooled.

The process of the invention, as herein described, has been found adapted to treat, to advantage different zinc oxids, including oxids substantially free from lead, as well as oxids containing appreciable amounts of lead. As previously stated, the zinc oxid may be subjected to only the reheating operation, in which event the material is collected at the bottom of the tubular retort in plain open pans and allowed to cool down naturally, or, in the case of certain zinc oxids, the reheating operation may be followed by the soaking operation.

In the reheating operation, the oxid is subjected to a high temperature, with corresponding improvement in its properties, so that it is available for use, if desired, without further treatment than cooling. In the soaking operation, the preheated or reheated oxid is maintained at an elevated temperature in its own atmosphere for a considerable period of time, as above described, whereby a further substantial improvement in the product may be effected. This improvement takes place slowly, requiring usually several hours. It is more rapid during the early period of the soaking, but, with most of the oxids treated, a marked change has been noted after each hour period up to six hours.

From the foregoing description it will be evident that the method of the present invention in its broad aspect involves passing the zinc oxid by the action of gravity alone and without mechanical agitation through a highly heated atmosphere and preferably in the form of a thin sheet or stream, so that substantially every particle of oxid is uniformly subjected to the necessary degree of heat for effecting the desired improvement in color. The passage of the oxid through the highly heated atmosphere in the form of a thin shallow stream is of particular importance and advantage, since it facilitates the penetration of the heat to every particle of the material and thus insures a practically uniform reheating of the entire mass.

While we consider it preferable and more advantageous to permit the zinc oxid to fall freely through the heated atmosphere, and to secure the necessary time interval of heating by providing a heating chamber or tube of sufficient vertical length for this purpose, we do not wish to restrict ourselves, in the more comprehensive claims appended hereto, to this preferred modification of the invention, but intend to include therein all modifications within the spirit and scope of the invention.

We claim:

1. The process of treating zinc oxid which comprises passing the oxid by the action of gravity alone and in the form of a relatively thin stream or sheet through a highly heated atmosphere; substantially as described.

2. The process of treating zinc oxid which comprises passing the oxid by the action of gravity and in the form of a relatively thin stream or sheet through a highly heated atmosphere, and maintaining the oxid at approximately the elevated temperature to which it is raised in passing through said highly heated atmosphere for an extended period of time thereafter; substantially as described.

3. The process of treating zinc oxid which comprises passing the oxid by the action of gravity through a chamber heated to a temperature varying from dull red to bright yellow, and maintaining the oxid at approximately the elevated temperature to which it is raised in passing through said highly heated atmosphere for an extended period of time thereafter; substantially as described.

4. The process of treating zinc oxid which comprises passing the oxid by the action of gravity and without mechanical agitation and in the form of a relatively thin stream or sheet through a chamber whose walls are heated to a temperature varying from a dull red to a bright yellow color; substantially as described.

5. The process of treating zinc oxid which comprises passing the oxid by the action of gravity and in the form of a relatively fine stream or sheet through a chamber whose walls are heated to a temperature varying from a dull red to a bright yellow color, and maintaining the oxid at approximately the elevated temperature to which it is raised in passing through said highly heated atmosphere for an extended period of time thereafter; substantially as described.

6. The process of treating zinc oxid which comprises passing the oxid by the action of gravity alone and without mechanical agitation through a relatively long chamber of elongated cross-section whereby the oxid passes through the chamber in the form of a relatively thin stream or sheet, and maintaining the walls of said chamber at a high temperature whereby the oxid is heated during its passage through the chamber; substantially as described.

7. The process of treating zinc oxid which comprises passing the oxid by the action of gravity through a relatively long chamber of elongated cross-section whereby the oxid passes through the chamber in the form of a relatively thin stream or sheet, maintaining the walls of said chamber at a temperature varying from a dull red to a bright yellow color, and maintaining the oxid at approximately the elevated temperature to which it is raised in passing through said highly heated atmosphere for an extended period of time thereafter; substantially as described.

8. The process of treating zinc oxid which comprises passing the oxid by the action of gravity through a relatively long chamber so disposed that the oxid falls freely and is not impeded in its passage therethrough by contact with the walls thereof, and maintaining the walls of said chamber at a high temperature whereby the oxid is heated during its passage through the chamber; substantially as described.

9. The process of treating zinc oxid which comprises passing the oxid by the action of gravity through a relatively long chamber so disposed that the oxid falls freely and is not impeded in its passage therethrough by contact with the walls thereof, said chamber being of elongated cross-section whereby the oxid in falling through the chamber spreads out in a relatively thin stream, and maintaining the walls of said chamber at a temperature varying from a dull red to a bright yellow color whereby the oxid is heated in falling through the chamber; substantially as described.

10. The process of treating zinc oxid which comprises supplying the oxid continuously to the upper end of a vertically disposed tube, maintaining the walls of the tube at a high temperature, and allowing the oxid to drop freely by gravity through the tube whereby the oxid is heated during its passage through the tube; substantially as described.

11. The process of treating zinc oxid which comprises supplying the oxid continuously to the upper end of an upright tube which is long and narrow in cross-section so that the oxid passes through the tube by gravity in a thin stream or sheet, and maintaining the walls of the tube at a high temperature whereby the oxid is heated during its passage through the tube; substantially as described.

12. The process of treating zinc oxid which comprises supplying the oxid continuously to the upper end of a vertically disposed tube which is long and narrow in cross-section so that the material falling through the tube spreads out in a thin sheet, maintaining the walls of the tube at a high temperature, and allowing the oxid to drop freely by gravity through the tube whereby the oxid is uniformly heated during its passage through the tube; substantially as described.

In witness whereof we affix our signatures.

FRANK G. BREYER.
EARL H. BUNCE.